United States Patent

[11] 3,553,397

| [72] | Inventor | Wolfgang Schmitz<br>Birkenau, Germany |
|---|---|---|
| [21] | Appl. No. | 789,445 |
| [22] | Filed | Jan. 7, 1969 |
| [45] | Patented | Jan. 5, 1971 |
| [73] | Assignee | Brown, Boveri & Cie Aktiengesellschaft<br>Mannheim, Germany<br>a corporation of Germany |
| [32] | Priority | Jan. 9, 1968 |
| [33] | | Germany |
| [31] | | No. 1,615,835 |

[54] DISCONNECTING DEVICE FOR FULLY INSULATED HIGH-VOLTAGE ELECTRICAL SWITCHGEAR
2 Claims, 1 Drawing Fig.

[52] U.S. Cl............................................... 200/48,
 200/148.4, 200/163
[51] Int. Cl........................................ H01h 31/00
[50] Field of Search............................ 200/148,
 148.2, 148.4, 48, (Inquired), 163

[56] References Cited

UNITED STATES PATENTS
2,723,367 11/1955 Bockman .................... 200/148.4

FOREIGN PATENTS
1,000,902 1/1957 Germany...................... 200/148.4

*Primary Examiner*—Robert K. Schaefer
*Assistant Examiner*—H. J. Hohauser
*Attorney*—Wilfond, Lerner & Tick

ABSTRACT: Disconnecting device for fully insulated high-voltage electrical switchgear includes an elongated electrically conductive middle portion and a pair of movable contact members located therein and serially electrically connected with one another, the contact members being displaceable individually along a path through a partial disconnect gap and into and out of a disconnect position for respectively breaking and making electrical contact with an adjacent electrical member. A tubular casing surrounds and is spaced from the middle portion, and is formed with a flanged lateral opening providing access from outside the casing to a fixed electrical contact member electrically connected to the movable contact members and extending from the middle portion in a direction transverse to the displacement path of the movable contact members.

PATENTED JAN 5 1971
3,553,397
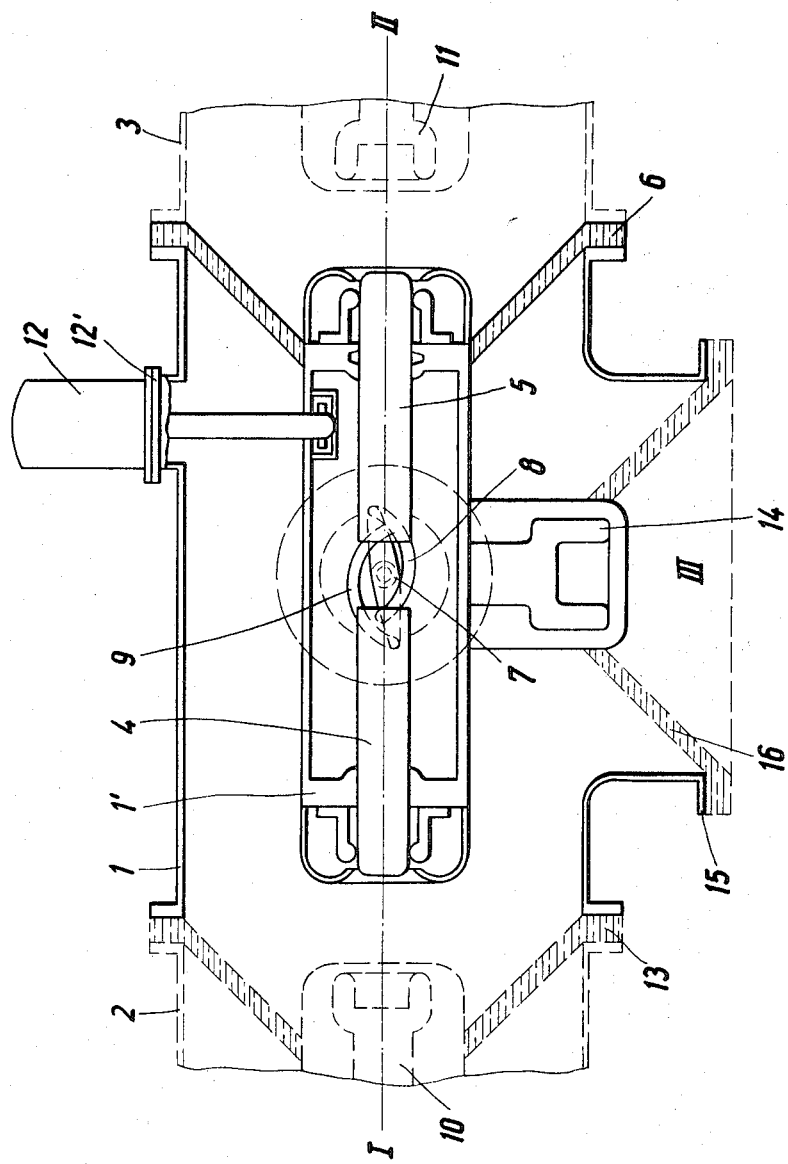

DISCONNECTING DEVICE FOR FULLY INSULATED HIGH-VOLTAGE ELECTRICAL SWITCHGEAR

My invention relates to a disconnecting device for fully insulated high-voltage electrical switchgear.

Such high-voltage switchgear include components subjected to voltage that are surrounded by an insulating medium, such as compressed gas or molding resin, for example, which borders directly on a conductive casing that is at ground potential. The conductive casing generally is in the shape of a tubular container.

In copending application Ser. No. 764,446, filed Oct. 2, 1968, of which I am coinventor with Lothar Gruber, and which is assigned to the same assignee as that of the instant application, there is disclosed a disconnecting device for fully insulated high-voltage electrical switchgear which includes an electrically conductive middle portion and a pair of contact members or disconnect lengths located in the middle portion and electrically connected in series with one another. Each of the contact members or disconnect lengths is rated for the entire insulation voltage. According to the aforementioned copending application, the contact members are displaceable individually through a partial disconnect gap into and out of a disconnect position so as to respectively break and make electrical contact with an adjacent electrical contact member. In the disconnect position of the contact member, the middle portion may be grounded.

A series of advantageous switching techniques and facilities are obtainable for the entire switchgear when the parts of the casing are assembled; namely, maintenance work and disassembly of component parts of the switchgear can be effected at one side of the disconnecting device without having to interrupt the electrical operation of the switchgear parts on the other side of the disconnecting device. Furthermore, test voltages from the middle portion of the disconnecting device can be applied to the individual switchgear parts at both sides of the disconnecting device depending upon which contact member or disconnect length is kept closed or open. The removal of specific switchgear parts or devices, such as voltage transformers, for example, that may be flanged to the disconnecting device is then no longer necessary.

It is an object of my invention to provide disconnecting device for fully insulated high-voltage electrical switchgear that is a further improvement over the disconnecting device of the aforementioned copending application.

It is a further object of my invention to provide such disconnecting device with means that will afford the further combination thereof with other devices. More specifically it is one of my objects to provide such disconnecting device which can, for example, be inserted in the train of a cable ring as a power outlet so that required assembly work (flanging and unflanging of various devices) can be effected at the part of the switchgear representing the power outlet without having to involve the remainder of the switchgear, i.e. without requiring the entire switchgear to be made inoperative. Thus, only the two disconnecting lengths need be opened.

It is yet another object of my invention to provide such disconnecting device that can be inserted in the cable ring so as to permit maintenance work to be performed on one side of the cable ring while providing a power outlet at the other side thereof.

Other features which are considered as characteristic for the invention are set forth in the appended claims.

Although the invention is illustrated and described herein as embodied in disconnecting device for fully insulated high-voltage electrical switchgear, it is nevertheless not intended to be limited to the details shown, since various modifications and structural changes may be made therein without departing from the spirit of the invention and within the scope and range of equivalents of the claims.

The construction of the invention, together with additional objects and advantages thereof will be best understood from the following description of specific embodiments when read in connection with the accompanying single FIG. of a drawing, which shows, diagrammatically and in longitudinal section, the improved disconnecting device of my invention.

Referring now to the drawing, there is shown a high-voltage disconnecting device having a casing 1 at ground potential and containing in the interior thereof a middle portion 1' in which there are disclosed two displaceable contact members 4 and 5. The middle portion 1' is capable of being grounded with the aid of a grounding device 12. Adjacent the casing 1 and coaxially aligned therewith are two additional casings 2 and 3 in which there are respectively contained fixed contact members 10 and 11 which form with the movable contact members 4 and 5 the disconnect lengths 4, 10 and 5, 11, respectively. The drive or actuation of the displaceable contact members 4 and 5 is effected by a shaft 7 through a pair of cranks 8 and 9. A coupling (not illustrated in the drawing) is disposed on the shaft 7, by means of which, in accordance with demand, both or the other of the cranks 8 and 9 or simultaneously both thereof can be actuated. It is obvious, of course, that one or the other displaceable contact member 4 or 5 or both thereof simultaneously can thus be made to travel into the disconnect position, as shown in the FIG. The middle portion 1' is supported in the interior of the casing 1 by an insulating member 6, and the fixed contact members 10 and 11 are supported by similar insulating members 13, only one of which is shown in the FIG. An additional fixed electrical contact member or terminal 14 is carried by the middle portion 1', and extends transversely to the direction of displacement of the movable contact members 4 and 5. The tubular casing 1 is formed with a lateral opening surrounded by a flange 15 through which access from outside the casing 1 may be had to the fixed electrical contact member 14. It is noted that the fixed contact member 14 is electrically connected to the middle portion 1' of the disconnecting device of my invention and therethrough to the movable contact members 4 and 5. An insulating member 16 corresponding in structure to the insulating members 6 and 13, i.e. having for example a frustoconical main body portion terminating in a circular flange portion, provides additional support for the fixed terminal 14. It may be expedient to undertake further gas bulk-heading between the individual parts of the switchgear by means of the insulator 16. However, in simplified switchgear, the insulator 16 may also be omitted.

The advantages of my improved disconnecting device are apparent from the following. If, for example, a nonillustrated power outlet is connected at the location III to the fixed terminal 14 and if locations I and II represent parts of a cable ring installation, any desired maintenance work, with associated flanging and deflanging of devices to the lateral opening flange 15 can be effected at the power outlet location III without having to render the remainder of the cable ring installation inoperative. The disconnecting device, as shown in the FIG. need only be driven into the disconnecting position at both ends of the middle portion 1'. In a similar manner, the installation part I can remain electrically connected to the part III, for example, while the installation part II can be made accessible for maintenance work. The grounding device 12 that is flanged at 12' to the casing 1, is thus withdrawn and the disconnecting length 4, 10 is closed while the disconnecting length 5, 11 remains open. If grounding is thereby necessary in the installation part II, it can be effected at some other suitable location thereof. Obviously, in a manner similar to the foregoing, electrical operation of the installation parts II and III can be maintained while part I is made accessible for maintenance work thereon.

The use of my improved disconnecting device having a power outlet terminal extending from the middle portion thereof and rendered accessible from outside the disconnecting device through a lateral flanged opening in the casing of the device, is in no way to be construed as being limited to the aforementioned cable ring switchgear but rather affords other switchgear concepts. For example, my improved disconnecting device can be disposed with both of the disconnecting lengths 4, 10 and 5, 11 thereof between two bus bar systems, while the additional contact member or terminal 14 and the flange 15 can be suitably connected to means for electrically energizing both bus bar systems or to means for withdrawing power from the terminal 14. Either one of the bus bar systems can then be selectively connected by suitable actuation of the movable contact members 4 and 5 for the purpose of electrically energizing or withdrawing current from the same, as the case may be. In such a case, it is also possible by suitably adjusting the particular one of the disconnecting lengths 4, 10 and 5, 11 associated with the part of the bus bar system that is not in operation to carry out maintenance work, with associated flanging and unflanging of devices, while the remaining part of the bus bar system can continue to operate through the other one of the disconnecting lengths.

In order to make complete use of the advantageous switching techniques available from my improved disconnecting device, it is recommended to construct at least one of the disconnecting lengths 4, 10 and 5, 11 as a load-breaking element. This would be particularly of value when the disconnecting device is inserted as a cable ring outlet, because the cable ring can then be readily broken or separated by the load-breaking element.

By means of my improved disconnecting device, therefore, a series of advantages relating to switching techniques and directed to the whole concept of fully insulated electrical switchgear can be attained, which especially permit maintenance work, and the flanging and unflanging of individual devices associated therewith, to be carried out in individual parts of the switchgear.

I claim:

1. Disconnecting device for fully insulated high-voltage electrical switchgear comprising a tubular casing, an elongated electrically conductive middle portion disposed within and in spaced relation to the inner surface of the tubular casing, and a pair of movable contact members located in said middle portion and electrically connected in series with one another, said movable contact members being individually displaceable along a path through a partial disconnect gap and into and out of a disconnect position for respectively breaking and making electrical contact with an adjacent electrical member, said middle portion having a fixed electrical contact member electrically connected to said movable contact members and extending from said middle portion in a direction transverse to said displacement path of said movable contact members, said tubular casing being formed with a flanged lateral opening providing access to said fixed contact member from outside said casing.

2. Disconnecting device according to claim 1, wherein at least one of said movable contact members and the electrical member adjacent thereto are in the form of a load-breaking element.